US008683211B2

(12) United States Patent
Jayet

(10) Patent No.: US 8,683,211 B2
(45) Date of Patent: Mar. 25, 2014

(54) METHOD OF PROJECTING A SECURE USB KEY

(75) Inventor: Stéphane Jayet, Meyzieu (FR)

(73) Assignee: Oberthur Technologies, Levallois Perret (FR)

( * ) Notice: Subject to any disclaimer, the term of this patent is extended or adjusted under 35 U.S.C. 154(b) by 402 days.

(21) Appl. No.: 12/636,087

(22) Filed: Dec. 11, 2009

(65) Prior Publication Data

US 2010/0153737 A1 Jun. 17, 2010

(30) Foreign Application Priority Data

Dec. 11, 2008 (FR) ...................................... 08 58478

(51) Int. Cl.
*H04K 1/00* (2006.01)
(52) U.S. Cl.
USPC ................................ 713/186; 726/20; 726/21
(58) Field of Classification Search
USPC ............. 713/185, 186, 172, 193, 182; 726/21
See application file for complete search history.

(56) References Cited

U.S. PATENT DOCUMENTS 5,485,519 A * 1/1996 Weiss .............................. 713/185
6,484,260 B1 * 11/2002 Scott et al. ..................... 713/186
2002/0046342 A1 * 4/2002 Elteto et al. ................... 713/185
2004/0187012 A1 * 9/2004 Kohiyama et al. ............. 713/193
2006/0208853 A1 9/2006 Kung et al.
2007/0120643 A1 5/2007 Lee
2008/0263364 A1 * 10/2008 Dundas et al. ................. 713/185

FOREIGN PATENT DOCUMENTS

FR 2 910 666 6/2008
WO WO 2008/024644 2/2008

OTHER PUBLICATIONS

S.L. Smith, "Authenticating Users by Word Association", Computers & Security, Elsevier Science Publishers, vol. 6, No. 6, pp. 464-470, Dec. 1, 1987.

* cited by examiner

*Primary Examiner* — Samson Lemma
(74) *Attorney, Agent, or Firm* — Cozen O'Connor

(57) ABSTRACT

A method of protecting a secure USB key comprising: a step of obtaining at least one parameter concerning the use of a function that can be executed on said key; a step of detecting at least one blocking condition that depends on said parameter, and where appropriate, a first check step suitable for preventing the execution of said function; a step of detecting at least one determined event independent of said function; and a second check step suitable for authorizing the execution of said first check step only in the event of said determined event being detected, said second check step being active even when said blocking condition is not satisfied.

14 Claims, 3 Drawing Sheets

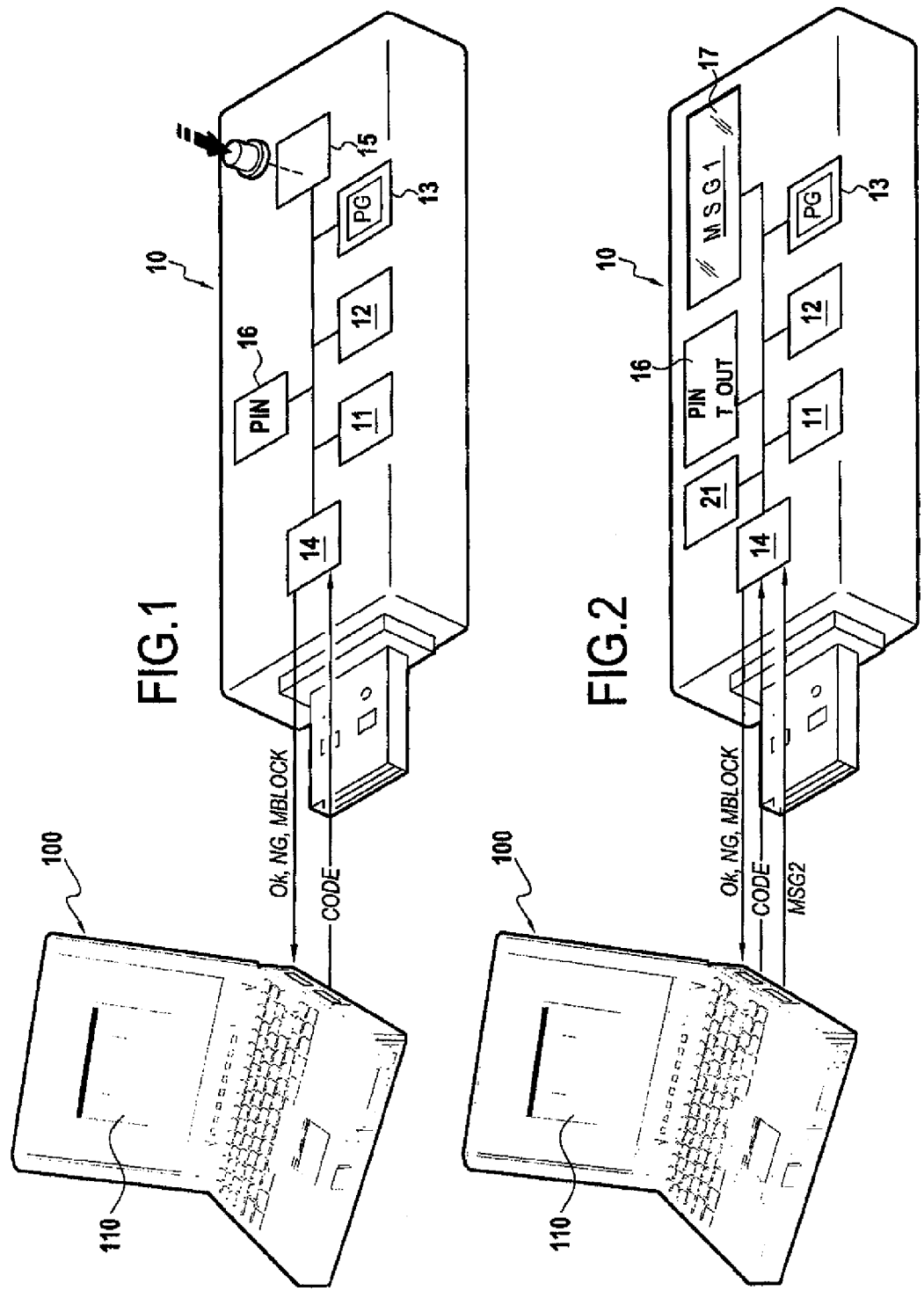

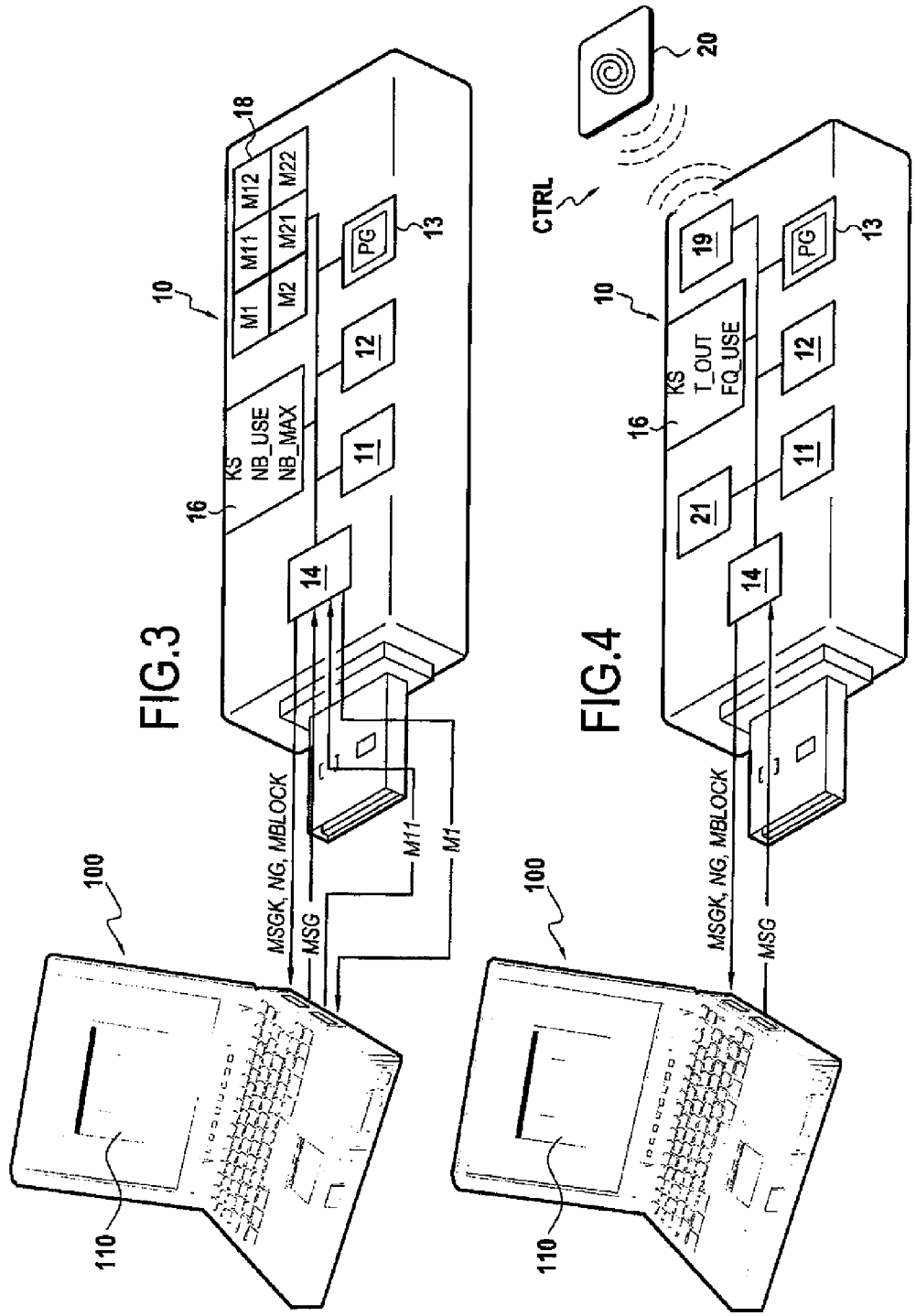

METHOD OF PROJECTING A SECURE USB KEY

RELATED APPLICATION

This application claims the priority of French application no. 08/58478, the entire content of which is hereby incorporated by reference.

BACKGROUND OF THE INVENTION

The invention lies in the field of protecting USB keys.

More precisely, the invention seeks to protect a function that is executed on a USB key against a malicious attack coming from the host station to which the key is connected.

The protected function may be of any type. In particular, it may be a function giving read or write access to a mass memory contained in the USB key, or it may be an authentication function.

One type of attack that may concern USB keys is known to the person skilled in the art as a "denial-of-service" attack. In general, such attacks consist in sending erroneous data to the USB key in order to stimulate the execution of the function on board the key for a malicious purpose.

For example, it is known to use USB keys (also known as "dongles" or as hardware locks) to authenticate the user of a software application that is being executed on the host station to which the key is connected, and possibly to block execution of said application in the event of authentication failing. By way of example, authentication may consist in comparing a code input by the user via the host station with a value stored in the USB key. In this first example, a denial-of-service attack may consist in sending successive erroneous codes to the USB key, until the software application is blocked.

USB keys are also known that are suitable for encrypting a message received from the host station by using a secret key. In this second example, a denial-of-service attack may consist in sending messages to the USB key in large numbers and/or at high frequency, i.e. in numbers or at a frequency greater than normal conditions of use.

One known solution for combating denial-of-service attacks (in particular for combating unwanted "spam" mail) is known under the name "Captcha" and consists in verifying that the data sent by a computer is indeed input by a human user and is not generated automatically by a software robot executing on the computer.

Unfortunately, those solutions are not perfect, and software robots of ever-higher performance are succeeding in recognizing the deformed letters at a good success rate.

OBJECT AND SUMMARY OF THE INVENTION

One aspect of the invention is directed to a secure USB key comprising:
  means for obtaining at least one parameter concerning the use of a function that can be executed on said key;
  first check means suitable for preventing execution of said function on detecting at least one blocking condition that depends on said parameter; and
  second check means suitable for activating said first check means only on detecting at least one determined event independent of said function, said second check means being active even when said blocking condition is not satisfied.

The first check means are suitable for preventing the execution of the function on detecting a blocking condition that depends on a parameter concerning use of the function.

By way of example, these means may use a blocking condition that depends on an indicator representative of the usage of the function, e.g. a count of the number of uses, a frequency of use, or a date of use of the function.

However, in the prior art, the first check means are always active, at least so long as the function has not been blocked. It has been shown that such means are very fragile when facing denial-of-service attacks.

In accordance with an embodiment of the invention, the first check means are themselves checked by second check means that are implemented by the secure USB key itself.

More precisely, the second check means authorize execution of the first check means only on detecting the occurrence of a determined event that is itself independent of the function.

In a particular embodiment, the second check means activate the first check means only for a determined duration starting from detection of the determined event.

In a particular embodiment, the duration is configurable.

Four examples of such an event are given below.

In a first embodiment, the second check means comprise a sensor and they are suitable for activating or not activating the first check means as a function of the state of the sensor.

Preferably, the sensor serves to ensure that the user is physically close to the USB key. For example, the sensor may be a pushbutton and the first check means are implemented only so long as the user is pressing on the button. In another example, the sensor may be constituted by a fingerprint sensor.

In a second embodiment of the invention, the USB key includes a display for displaying a first message, and means for receiving a second message as issued by the host station, the second check means being suitable for comparing the messages and for activating the first check means when said messages are identical.

In a third embodiment, the USB key has a table associating at least one first message with at least one second message, means for presenting one of the first messages to the user, and means for receiving a message issued by the host station, said second check means being suitable for activating said first check means if the message received from the host station is associated, in the table, with the message sent to the host station.

Typically, the first message may be a question posed to the user of the host station and the second messages possible replies to the question.

Once more, the host station sending erroneous messages does not cause the application to be blocked, but merely inhibits the first check means.

In a fourth embodiment, the USB key includes communications means suitable for exchanging authentication information with an external device, the second check means activating or not activating the first check means as a function of the authentication information.

By way of example, the external device may be constituted by a contactless smart card and the authentication information may be authentication information of said smart card for use with the secure USB key.

The invention is particularly well adapted to protecting USB keys that make use of a secret value protected by the first check means: a crytographic key, a personal identification number (PIN code), . . . .

If the protected function of the USB key is an authentication function based on comparing a PIN code, erroneous PIN codes issued by the host station will be ignored unless the user inputs via the host station a message that is displayed on the USB key, said message not being transmitted to the host station.

In a variant, the check information may be restricted to an identifier of the external device, said identifier being verified by the inhibition means of the USB key.

Another aspect of the invention is directed to a method of protecting a secure USB key, the method comprising:
- a step of obtaining at least one parameter concerning the use of a function that can be executed on said key;
- a step of detecting at least one blocking condition that depends on said parameter, and where appropriate, a first check step suitable for preventing the execution of said function;
- a step of detecting at least one determined even independent of said function; and
- a second check step suitable for authorizing the execution of said first check step only in the event of said determined event being detected, said second check step being active even when said blocking condition is not satisfied.

In accordance with an embodiment of the invention, the first check step is suitable for authorizing execution of the function only when the event is detected and the blocking condition is not satisfied.

The advantages and characteristics particular to the protection method can be the same as those mentioned above for the USB key.

In particular, the step of detecting at least one determined event independent of said function may include:
- detecting the state of a sensor of said USB key;
- verifying that a message received from the host station is identical to a message displayed on a display of the USB key;
- verifying that a message received from the host station is associated, in a table of the USB key, with a message presented to the user; and
- verifying authentication information exchanged with an external device.

In a particular embodiment, the various steps of the protection method are determined by computer program instructions.

Consequently, an aspect of the invention involves a computer program on a data medium, the program being suitable for being implemented in the secure USB key, the program including instructions adapted to implement the steps of a protection method as described above.

The program may use any programming language, and it may be in the form of source code, object code, or code intermediate between source code and object code, such as in a form that is partially compiled, or in any other desirable form.

Another aspect of the invention relates to a data medium readable by a USB key, and including instructions of a computer program as mentioned above.

The data medium may be any entity or device capable of storing the program.

Furthermore, the data medium may be a transmission medium such as an electrical or an optical signal, suitable for being conveyed via an electrical or an optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

FIGS. 1 to 4 show four USB keys in accordance with the invention in particular embodiments.

DETAILED DESCRIPTION OF THE DRAWINGS

Figure 5:
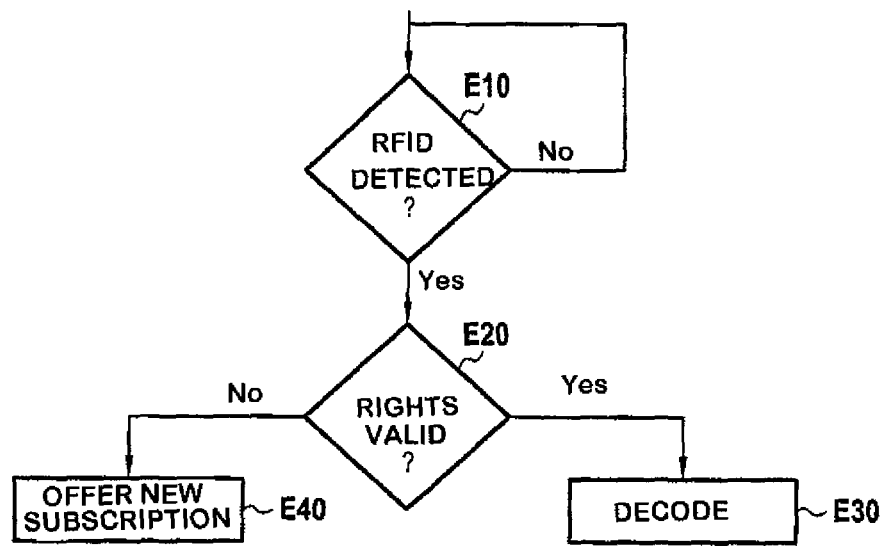
FIG. 5 is a flow chart showing the main steps of a protection method in accordance with an embodiment of the invention.

FIG. 1 shows a secure USB key 10 in accordance with the invention, in a first embodiment.

The USB key 10 comprises a processor 11, a random-access memory (RAM) 12, a read-only memory (ROM) 13, and a re-writable non-volatile flash type memory 16, together with means 14 for communicating with a host station 100 on which a software application 110 is run.

The ROM 13 constitutes a recording medium in accordance with the invention, having a computer program PG in accordance with the invention recorded therein, the program including instructions for executing the steps of a protection method in accordance with the invention, which steps are shown in the form of a flow chart in FIG. 5, as described below.

In the presently-described embodiment, the USB key is used as an external mass memory for the host station 100, with access to said memory being authorized only once a code has been input via the keyboard of the host station 100 and received by the communications means 14 of the USB key, with said code corresponding to a personal identification number (PIN) code stored in the flash memory 16.

Comparing a code issued by the host station with the PIN code constitutes a first check in the meaning of the invention. More precisely, this first check, performed by executing the computer program PG, comprises the following operations:
- receiving a code issued by the host station and comparing it with the PIN code stored in the flash memory 16;
- if the code issued by the host station 100 is valid, the processor 11 returns a message OK to the host station and sets a flag in the flash memory 16 to authorize access to the mass memory;
- if the code is invalid, the processor 11 returns a message NG to the host station 100; and
- if the number of invalid codes received by the USB key is greater than a predetermined number, the processor 11 sets a flag in the flash memory 16 to prevent any future access to the mass memory and any comparison of a code that might be received subsequently with the PIN code.

In accordance with the invention, the USB key 10 includes second check means for activating or not activating the first check means.

In the embodiment of FIG. 1, the USB key includes for this purpose a pushbutton associated with a sensor 15, with comparison being performed only while a user is pressing on the pushbutton.

Thus, if the pushbutton is released, the sending of invalid codes by the application 110 of the host station 100 is without effect.

FIG. 2 shows a USB key in accordance with the invention constituting a second embodiment.

In this embodiment, the USB key 10 includes a clock 21 and a display 17 on which it can display a randomly-generated message MSG1.

The display invites the user to key the message MSG1 into the keyboard of the host station and to actuate a software button so that the keyed-in message is sent to the USB key.

In this embodiment of the invention, the processor 11 compares the message MSG2 issued by the host station 110 with the message MSG1 displayed on the display 17, and when the messages are identical, it activates the function of comparing a received code with the PIN code during a determined duration T_OUT stored in the non-volatile memory 16, said duration being measured by the clock 21.

FIG. 3 shows a third embodiment of the invention.

In this embodiment, the USB key 10 is a key suitable for encrypting a message MSG received from the host station 100 via the communications means 14, by using a secret key KS stored in its flash memory 16, and then returning the encrypted message MSGK to the host station 100.

In the presently-described embodiment, the USB key 10 has a table 18 in which first messages M1 (or M2) are each associated with at least one second message M11, M12 (or M21, M22).

In this embodiment, the processor 11, running the computer program PG, selects a message randomly from the list of first messages M1, M2, sends it to the host station, and waits for the host station 100 to respond with a response message.

In this embodiment, the USB key includes first check means suitable for storing the number of times NB_USE of the encryption function is used and for preventing said function being used if the number exceeds a threshold NB_MAX, these values being stored in the flash memory 16.

In this embodiment, the first check means are activated if the message M11 issued by the host station 100 is associated in the table 18 with the message M1 sent to said host station.

FIG. 4 shows a fourth embodiment of the invention.

In this embodiment, the USB key 10 measures the frequency FQ_USE with which the encryption function is used, this frequency being stored in the flash memory 16, and it possesses first check means suitable for deactivating the encryption function if the frequency of use FQ_USE of said function exceeds a threshold value.

In this embodiment, the USB key 10 includes means for communicating with an external device 20.

In the presently-described embodiment, the external device 20 is a contactless smart card and the communications means 19 are adapted to communicate with said smart card by near-field communication, having a range of a few centimeters, for exchanging authentication information.

In a particular embodiment, this information comprises information suitable for enabling the USB key 10 to authenticate the contactless smart card 20.

In any event, in this fourth embodiment of the invention, the first check means are activated throughout the determined duration T_OUT as measured by a clock 21, providing the external device 20 is indeed authenticated.

FIG. 5 shows the main steps of an authentication method in accordance with the invention.

The method is implemented by a USB key 10 as described above with reference to FIGS. 1 to 4.

In this example, it is assumed that the USB key implements a decoding function for digital terrestrial television, the key being suitable for connection to a digital decoder connected to a TV set.

During a step E10, the USB key 10 verifies whether a determined event occurs that is independent of said decoding function. In the example described here, this step consists in authenticating an electronic radio frequency identity (REID) label incorporated in the decoder.

In the presently-described embodiment, the protection program loops on step E10 so long as the event is not detected.

If the event is detected, step E10 is followed by a step E20 during which the USB key verifies whether a blocking condition is satisfied that depends on a parameter concerning usage of the decoding function. For example, this may involve verifying, as a function of the current date DC, whether the user's subscription is still valid, or whether it has expired.

In the presently-described embodiment, the digital TV program is decoded if the user's rights are valid (step E30), otherwise, when the blocking condition occurs, the user is given the option (step E40) of renewing the subscription by confirming an offer made on the TV screen by the decoder.

What is claimed is:

1. A secure USB key comprising:
a hardware processor;
means for obtaining at least one parameter concerning use of a function that can be executed on said key;
first check means suitable for preventing execution of said function on detecting at least one blocking condition that depends on said parameter; and
second check means suitable for activating said first check means only while detecting, or within a defined time period after detecting, at least one determined event independent of said function, said second check means being active even when said blocking condition is not satisfied,
wherein said first check means are adapted to authorize execution of said function only when said event is detected and when said blocking condition is not satisfied, and
wherein said blocking condition depends on a usage indicator representative of the usage of said function.

2. The secure USB key according to claim 1, wherein said function uses a secret value protected by said first check means.

3. The secure USB key according to claim 2, wherein said secret value is a cryptographic key.

4. The secure USB key according to claim 2, wherein said secret value is a personal identification number.

5. The secure USB key according to claim 1, wherein said usage indicator is a value selected from:
a counter of the number of uses of said function;
a frequency of usage of said function; or
a date of use of said function.

6. The USB key according to claim 1, wherein said second check means include a sensor and are suitable for activating or not activating said first check means as a function of the state of said sensor.

7. The USB key according to claim 6, wherein said sensor is a fingerprint sensor.

8. The USB key according to claim 1, including a display for displaying a first message, and means for receiving a second message issued by a host station, said second check means being suitable for comparing said messages and for activating said first check means when said messages are identical.

9. The USB key according to claim 1, including a table associating at least one first message with at least one second message, means for presenting one of said first messages to the user, and means for receiving a message issued by a host station, said second check means being suitable for activating said first check means if the message received from said host station is associated in said table with the message sent to the host station.

10. The USB key according to claim 1, including communications means suitable for exchanging authentication information with an external device, and wherein said second check means activate said first check means as a function of said authentication information.

11. The USB key according to claim 1, wherein said second check means activate said first check means only during a predetermined duration measured from detecting the determined event.

12. A method of protecting a secure USB key, the method comprising:
   a step of obtaining at least one parameter concerning the use of a function that can be executed on said key;
   a step of detecting at least one blocking condition that depends on said parameter, and where appropriate, a first check step suitable for preventing the execution of said function;
   a step of detecting at least one determined event independent of said function;
   and a second check step suitable for authorizing the execution of said first check step only while detecting, or within a defined time period after detecting, said at least one determined event, said second check step being active even when said blocking condition is not satisfied,
   wherein said first check step is suitable for authorizing the execution of said function only when said event is detected and said blocking condition is not satisfied, and
   wherein said blocking condition depends on a usage indicator representative of the usage of said function;
   wherein at least one of the steps is implemented by a hardware processor.

13. A computer program stored in a non-transitory memory and executing on a processor of said USB key, said computer program including instructions which cause the processor to execute the steps of the method according to claim 12 for protecting a secure key as said program is executed by said USB key.

14. A non-transitory recording medium readable by a secure USB key and having recorded thereon a computer program including instructions for executing the steps of the protection method of claim 12.

* * * * *